United States Patent Office 3,354,252
Patented Nov. 21, 1967

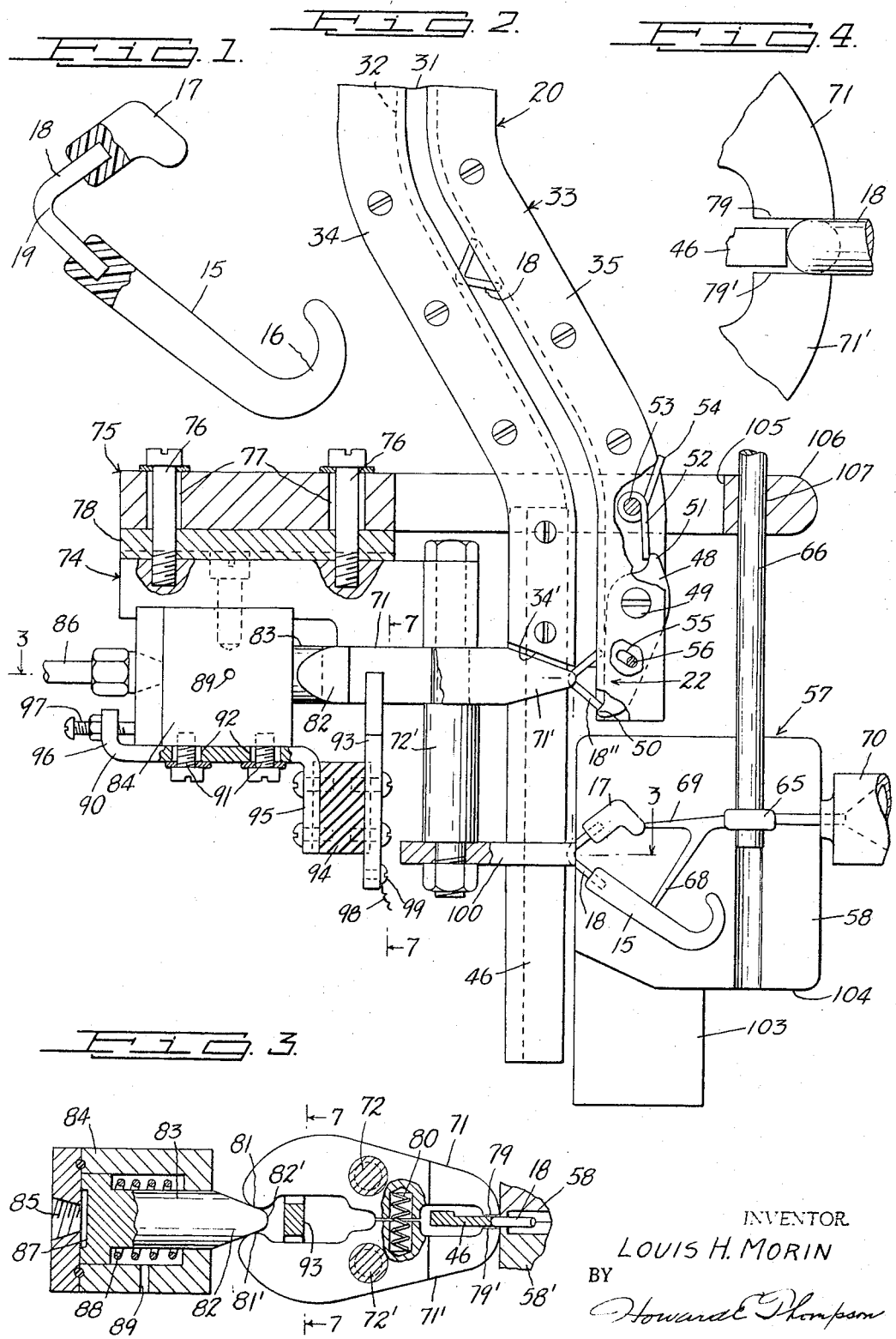

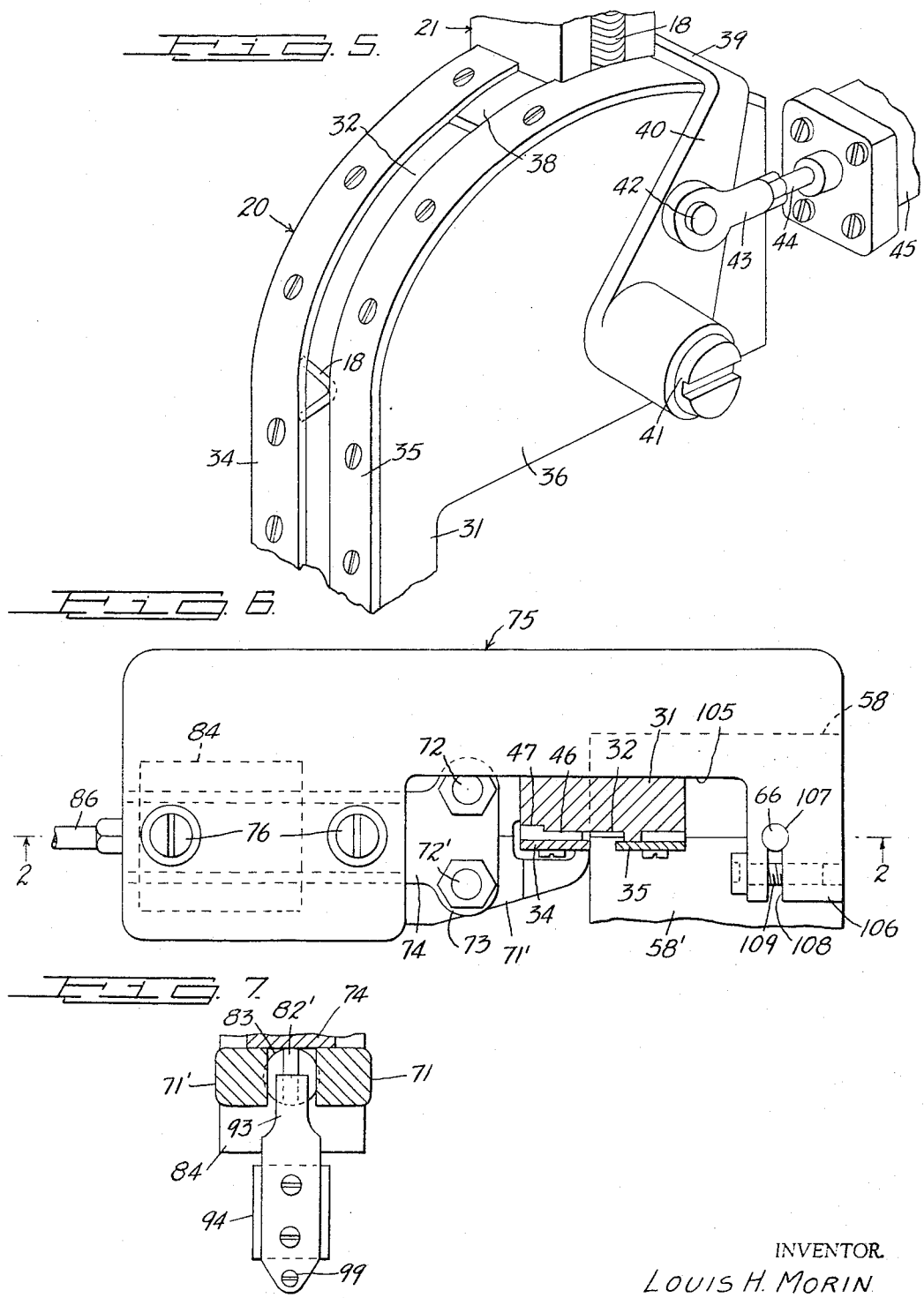

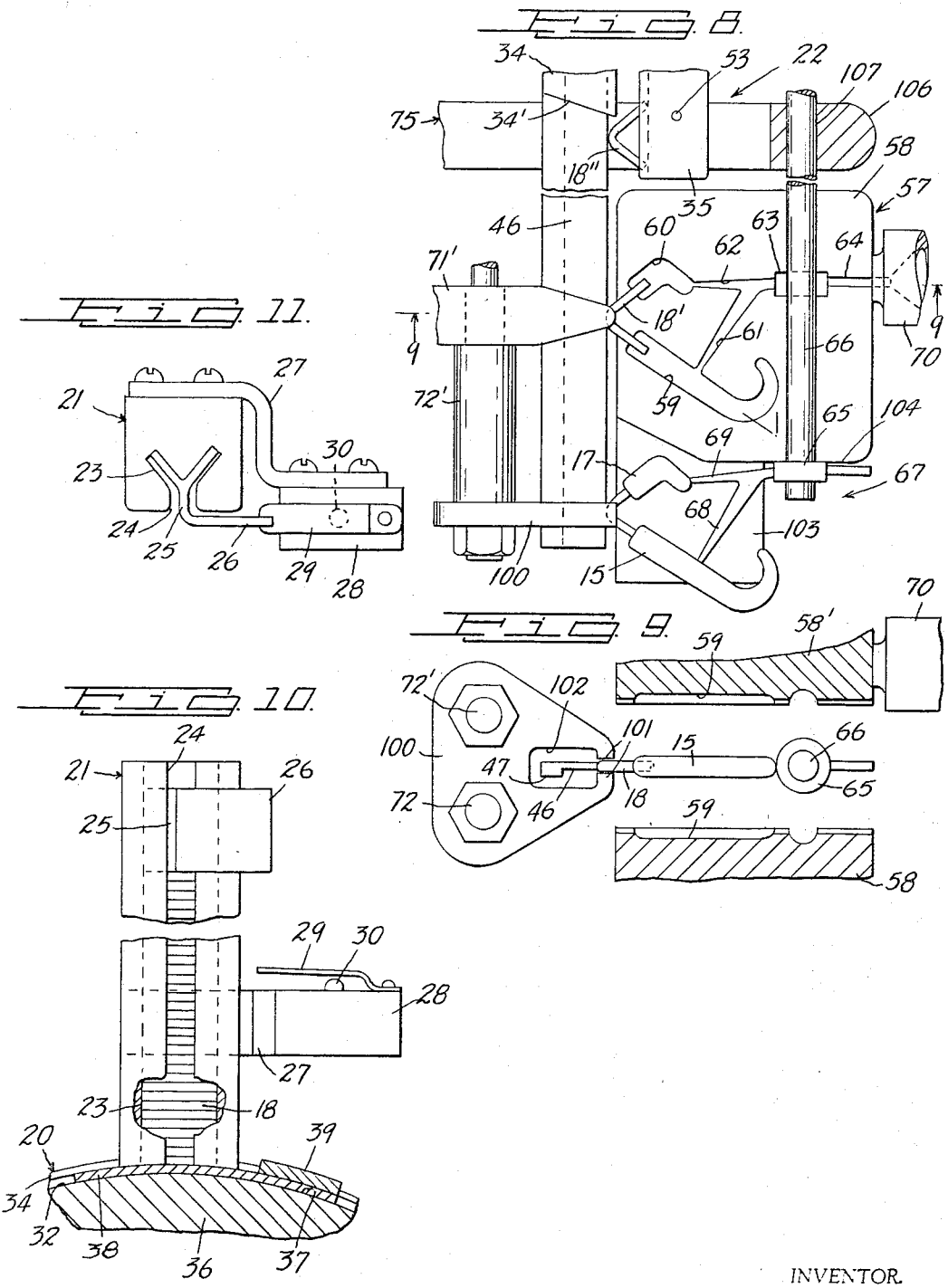

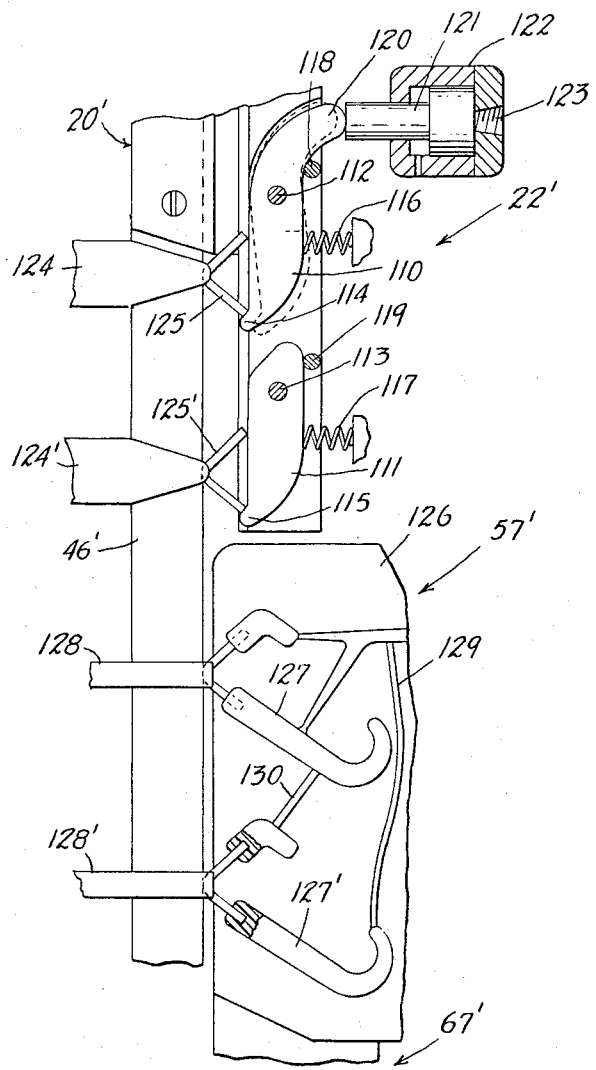

1

3,354,252
METHOD OF FEEDING INSERTS FROM A PRE-LOADED MAGAZINE INTO A MACHINE MOLDING INSERT TRAVELERS
Louis H. Morin, Bronx, N.Y., assignor to Coats & Clark Inc., New York, N.Y., a corporation of Delaware
Filed Mar. 11, 1964, Ser. No. 351,107
3 Claims. (Cl. 264—278)

This invention relates to machines for producing travelers and like plastic moldings, wherein inserts are part of the resulting end product. More particularly, the invention deals with a method employing a pre-loaded magazine storing inserts, with means associated with the magazine for automatic stoppage of an automatic molding machine at a predetermined time to control re-loading of the magazine.

Still more particularly, the invention deals with a method and apparatus, wherein means is provided at the molding station for momentarily holding inserts at a pickup station, together with means for picking up inserts at said pickup station and delivering them to and supporting them at the molding station and, further, to the provision of means for guiding inserts of a molded traveler to a trimming and stripper station adjacent said molding station.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged detail view of a molded insert traveler produced according to my invention, with molded parts of the traveler broken away to illustrate arrangement of the insert therein.

FIG. 2 is a sectional view, generally on the line 2—2 of FIG. 6, with parts of the construction shown in elevation and parts broken away and illustrating the pickup of an insert at the pickup station, with the support of an insert at the molding station, part only of the inserts being shown in the insert delivery guide.

FIG. 3 is a detail sectional view on the broken line 3—3 of FIG. 2, with parts of the construction shown in section and parts in elevation.

FIG. 4 is an enlarged detail view of a part of the construction shown in FIG. 3.

FIG. 5 is a diagrammatic perspective view of the lower portion of a pre-loaded magazine and the upper portion of the guide for delivering inserts to the pickup station illustrated in FIG. 2 of the drawing, part only of the inserts being shown.

FIG. 6 is a plan view of the structure, as seen in FIG. 2, with part of the structure in section and omitting parts shown in FIG. 2 and also omitting the insert.

FIG. 7 is a partial section on the line 7—7 of FIGS. 2 and 3, both sections being represented on both figures for clarity.

FIG. 8 is a diagrammatic view, similar to FIG. 1, showing parts in a different position to illustrate a molded insert traveler at the trimming and stripper station.

FIG. 9 is a diagrammatic section on the broken line 9—9 of FIG. 8, assuming that the parts are in the position of FIG. 2 rather than the specific showing in FIG. 8 and illustrating the dies in open position.

FIG. 10 is a detail view of the vertically arranged pre-loaded insert magazine and its relationship to the upper portion of the delivery means, part of the magazine being broken away.

FIG. 11 is a plan view of the magazine and associated parts only, as seen in FIG. 10, omitting the background showing; and FIG. 12 is a diagrammatic view, generally similar to

2

FIG. 8, showing only parts of the construction and illustrating the method of picking up pairs of inserts and forming a pair of travelers at a molding station.

In illustrating one adaptation of my invention, I have shown on an enlarged scale in FIG. 1 of the drawing a side view of a traveler, with portions of the traveler broken away to illustrate mounting of an insert therein. The traveler comprises a long part 15, having a hook-shaped end 16 and a short angular end part 17 joining 15 in a substantially V-shaped rod-like insert 18, which spaces 17 from 15 and forms the rounded thread engaging portion 19 of the traveler. 18 is preferably of a wear resistant material to provide long service use of the traveler. The parts 15, 17 are formed from suitable molded plastic material, such as nylon, Delrin or the like.

Considering FIGS. 2, 5 and 10 of the drawing, in these figures I have indicated generally at 20 a guide track or runway for directing inserts 18 from a vertical storage hopper 21 to the insert pickup station 22 at the lower portion of 20, as noted in FIG. 2 of the drawing.

The hopper 21 comprises an elongated strip, having a Y-shaped recess 23 extending longitudinally thereof and opening through one surface of the hopper, as seen at 24, note FIG. 11. Mounted in the upper end portion of the recess 23 is a Y-shaped follower 25, having an offset arm 26 extending beyond one side of the hopper, as clearly noted in FIGS. 10 and 11. Secured to the lower portion of the hopper is an offset bracket 27 supporting a microswitch 28, having a yieldable member 29 for actuation of the button 30 of the microswitch. The bracket and microswitch will be located at a predetermined distance from the lower end of the hopper, so as to provide an automatic stoppage of the machine forming the molded travelers, as later described. In other words, when the arm 26 of the follower engages and depresses 29 to actuate the button 30 of the microswitch, the machine will be stopped, there being a few of the inserts 18 at a position below the location of the switch. The track or runway 20 comprises an elongated bar 31 having a traveler receiving recess 32 on the front surface thereof. The bar 31 may include an offset portion near its lower end, as indicated at 33 in FIG. 2 of the drawing, to offset the upper portion from the lower portion having the pickup station 22. Mounted on the recessed surface of the bar 31 are retainer and guide plates 34 and 35 which overlap the recess, as indicated in FIGS. 2 and 6 of the drawing, to retain the inserts 18 against displacement from the recess 32.

At the upper portion of the bar 31 is an enlarged block or frame 36, having a rounded upper surface 37 and mounted in the recess 32, which extends onto the surface 37, is a feed or pusher strip 38, shown in section in FIG. 10 of the drawing. Fixed to the end portion of this strip is the offset end 39 of an oscillated lever 40, diagrammatically shown in FIG. 5 of the drawing, the lever being pivoted on 36, as seen at 41. Mounted on a pin 42 on the face of the lever is a coupling end 43 of a piston rod 44 extending from an air cylinder shown, in part, at 45 in FIG. 5 of the drawing, so that, in the operation of the molding machine, at predetermined intervals, inserts 18 will be picked up from the lower end of the hopper and fed into the track 20 for delivery to the pickup station 22. For simplification, only part of these inserts are shown in FIGS. 2 and 5 of the drawing, it being understood that these inserts will extend throughout the length of the track 20 between the upper delivery end having the feed 38 therein to the pickup end of the track, the delivery of the inserts being consistent with output of the inserts from the lower end of the track.

Fixed to the lower end of the side portion of the bar 31, to which 34 is attached, and extending beyond 34 and the bar is a guide strip 46 having a widened side key portion 47 engaging the bar, as clearly noted in FIG. 6 of the drawing.

The lower end of 34 terminates in an angular surface 34' at the pickup station 22, as clearly noted in FIG. 2 of the drawing. The lower end portion of the strip 35 projects below the end 34' and this end portion of the bar 31 is recessed to receive an escape lever 48, pivoted as seen at 49 in FIG. 2. The lever has a lower offset insert checking end 50 for retaining a last or lower insert at the pickup station 22. The upper end of the lever 48 has an offset 51 engaged by one end of a coil spring 52 mounted on a pin 53 in the bar 31, the other end portion 54 of the spring engaging said bar. The spring end 52 normally urges the offset end 50 into operative position. The lever 48 has an elongated aperture engaged by a pin 56 to check movement of the lever in both directions, as clearly indicated in FIG. 2 of the drawing.

Below the station 22 and in predetermined spaced relationship thereto is a molding station 57 comprising a pair of relatively movable dies, one die being shown at 58 in FIGS. 2 and 8, and the companion die being shown, in part, at 58' in FIG. 9, where the dies are illustrated in open position. The dies collectively form mold cavities 59 and 60, note FIG. 8, for respectively forming the parts 15 and 17 of the resulting traveler, as shown in FIG. 2. As will be seen in FIGS. 2, 3, 4, 8 and 12, the apex of the insert 18 projects from the dies 58, 58' and as the insert moves successively from the pickup station to the molding station to the trimming station, the apex is guided by contact with track 46. Extending to these cavities are gates or runners 61, 62 which extend from a ring-like cavity 63, into which the primary gate 64 extends, the cavity 63 forming, as part of the molding station, a ring-like member 65 on a transfer core pin 66 arranged between the dies. The pin 66 is utilized for moving the molded traveler assemblage from the molding station 57 to a trimming and forming station, as at 67 FIG. 8 of the drawing, where runners 68 and 69 are trimmed from 15 and 17, respectively, after which, the ring 65 is stripped from the core 66, as this pin moves upwardly to its normal or molding position, as illustrated in FIG. 2 of the drawing. In other words, after the molding operation has been performed at the station 57, the pin moves the molded assemblage to the position shown at the trimming and stripper station 67, FIG. 8 at the same time a new insert has been positioned in registration with the cavities 59 and 60, as indicated at 18' in FIG. 8 of the drawing. In FIGS. 2, 8 and 9, I have indicated, in part, at 70 the injection nozzle which registers with 64 in the injection stroke of the machine and is moved to the surface of one of the dies, as, for example, the die 58' of FIG. 9 when the dies are opened to seal the end of the nozzle, preparatory to the next molding operation.

In picking up inserts from the pickup station and delivering them to the molding station, as indicated in FIG. 8 of the drawing, I provide a pickup and feed mechanism, comprising a pair of grippers 71, 71', which are generally of the same construction, the grippers being pivotally supported on rods 72, 72' mounted in connection with an enlarged end portion 73 of an arm 74, note FIG. 6, adjustably secured to a plate 75, as by screws 76 operating in elongated apertures 77 in the plate 75, note FIG. 2.

Between the plate 75 and the arm 74 is a spacer 78, the thickness of which will control vertical location of the engagement of the grippers 71, 71' with the insert when supported at the pickup station, as indicated at 18'' in FIG. 2 of the drawing. The grippers have contracted ends, as clearly noted in FIG. 2 of the drawing, and the contracted end portions have opposed gripper surfaces, as indicated at 79, 79' in FIG. 3 of the drawing. Both grippers are recessed to receive a spring 80, which normally supports 79, 79' in spaced relationship to the guide 46 and the insert, but sufficiently close to the insert to provide a guide therefor in movement of the formed traveler from the casting station 57 to the station 67. The opposed ends of the grippers 71, 71' have inwardly directed opposed rounded portions 81, 81' engaged by a V-shaped or contracted end 82 on the projected end of a piston 83 mounted in an air cylinder 84 having means, as at 85, for coupling a compressed air supply pipe 86 to the cylinder, the latter being shown in FIG. 2 of the drawing. The head end of the piston 83 is enlarged and recessed, as seen at 87 in FIG. 3, and engaging this enlarged end is a coil spring 88 arranged in the cylinder for normally urging the piston into the inoperative position shown. When air is admitted under pressure, the end 82 moves to the right, as shown in FIG. 3, moving the jaw ends 79, 79' into gripping engagement with an insert at the pickup station 22 in transfer of this insert to the molding station 57, as illustrated in FIG. 8 of the drawing, the grippers being shown at the pickup station in FIG. 2. However, in this figure, the piston has not been advanced to establish the engagement. The cylinder 84 has an exhaust port 89 for exhausting air from the cylinder to provide free action of the piston.

Adjustably mounted on the cylinder 84 is a bracket 90, note FIG. 2, the adjustment being by means of two screws 91 operating in elongated apertures 92 in the bracket. This adjustment is to control position of a switch plate 93 mounted on an insulated block 94 supported on an offset end 95 of the bracket. The other end of the bracket is offset, as seen at 96, to support an adjustment screw 97 in accurately gauging adjustment of the bracket to control spacing of 93 from the forward contracted end 82' of the piston 83 with respect to 93, so that, in the event that an insert is not positioned at the station 22, as noted at 18'', the end 82' will strike the switch plate and complete a circuit through a wire 98 supported on a screw 99 fixed to the plate. Here again, the wire 98 will be in a circuit controlling stoppage of the molding machine. It will clearly appear that the upper end of 93 is positioned between the two grippers inwardly of the ends 81, 81'. This is also clearly illustrated in FIGS. 3 and 7 of the drawing.

Also supported on the rods or studs 72, 72' at their lower ends is a substantially triangular-shaped auxiliary guide unit 100, note FIG. 9, having inwardly directed and opposed guide portions 101 beyond a recess portion 102 of the unit, the recess 102 clearing the insert guide extension 46 and the spacing of 101 is such as to prevent relative swinging movement of the insert, as the insert is moved from the molding station to the trimming and stripper station. It will be apparent that, when the grippers are moved to the pickup station 22 in FIG. 2, the unit 100 is positioned at the molding station 57 so that, when the molded traveler assemblage is moved from the molding station 57 to the trimming and stripper station 67, this assemblage will be guided by the unit 101, as the pin 66 moves the assemblage to the station 67.

The dies, or at least one of the dies, will have an extension 103 at the trimming or stripper station and suitable trimming tools, not shown, will trim off the runners 68 and 69 and the ring 65 will be stripped from the lower surface 104 of the dies proper after the trimming operation has been performed and as the core pin 66 is moved upwardly from the position of FIG. 8 to the position of FIG. 2.

In the diagrammatic showing of FIG. 9 of the drawing, the section through the dies are on the broken line indicated in FIG. 8, in other words, presumably to extend through the cavity 59 formed by both dies, but not showing the cavity 63, which would form the ring 65. In FIG. 9, the completely molded assemblage is diagrammatically illustrated in a bottom view illustration.

Considering FIG. 6 of the drawing, it will appear that the bar 31 extends into a recessed portion 105 of the plate 75 and the end portion 106 of the plate is apertured, as seen at 107, to receive the transfer rod 66, the end 106 being slitted, as seen at 108, and a screw 109 passes through the slitted portion in securely clamping the rod 66 to the plate 75. It is through this engagement that the means employed for actuating the rod 66 moves the entire assemblage including the grippers 71, 71', the cylinder 84 and the associated parts including the auxiliary guide 100 into the raised and lowered positions described in moving the respective parts to the stations identified.

From the foregoing, the operation of the apparatus, as diagrammatically illustrated in the accompanying drawings, will be apparent to those skilled in the art from the foregoing description, with the following brief statement.

The inserts are constantly fed to and delivered to the pickup station by the means disclosed and, as an insert, such as 18" is picked up at the station 22, the insert forces the lever against the action of the spring employed to free the lower insert for delivery to the station 57; whereupon, the next successive insert of the track 20 is immediately picked up and held by the lever at the station 22, until such time as this next successive insert is picked up by the grippers, preparatory to the next molding operation. The insert is supported at the molding station 57 by the grippers until the dies 58, 58' are closed and until the plastic material is pressure injected into the cavities; whereupon, the grippers return to the pickup station and the auxiliary guide 100 is brought into registering engagement with the insert at the molding station, as shown in FIG. 2. Then, as the next successive insert is moved by the grippers to the molding station, the pre-formed traveler assemblage at the molding station 57 is moved to the trimming and stripper station 67 with the dies in open position; whereupon, the dies are partially closed for performing the stripping operation, removing the trimmed runners, including the ring 65, then the dies are fully closed, with the core pin 66 in its raised position as shown in FIG. 2 and the above cycle of operation is repeated.

In the modification diagrammatically illustrated in FIG. 12 of the drawing, 22' represents a pickup station and 57' represents a molding station and at 20' is shown the lower portion of a track or runway, generally similar to the track or runway 20, and modified to the extent of being sufficiently long to support two escape levers 110 and 111 arranged one above the other, the levers being pivoted at 112 and 113, both levers having, at their lower ends, insert engaging offsets 114 and 115 and coil springs 116 and 117 are employed to normally urge the levers into operative position, which position is checked by stops 118 and 119. The lever 110 has a lateral or outward offset 120 at its upper end adapted to be engaged by an air actuated plunger 121 arranged in a cylinder 122, air being admitted to the cylinder, as seen at 123 by a pipe or tube coupled therewith.

At 124, 124' I have shown two grippers, similar to the grippers shown in FIGS. 1 and 2 of the drawing, adapted to pick up a pair of inserts 125, 125' supported by the levers 110 and 111, as diagrammatically illustrated. At 46' is shown a guide strip, similar to the strip 46, for guidance of the inserts from the pickup station 22' to the molding station 57'. At 126 I have shown at the station 57' the face view of one of the dies, which will be employed for forming a pair of travelers 127, 127' on the pair of inserts when delivered to the molding station.

After the molding operation, the molded travelers, together with their inserts, are supported by a pair of guide units 128, 128', similar to the unit 100 shown in FIGS. 1 and 9 of the drawing, for guidance of the pair of molded travels to the trimming and stripper station 67' at the lower surface of the die 126, in the manner diagrammatically illustrated in FIG. 8 of the drawing. The sprue gate and runners directed to the cavities forming the two travelers 127, 127' is generally identified by the reference character 129, it being noted that a runner extending between the two cavities is included at 130.

The operation of the modified showing in FIG. 12 differs slightly from the showing in FIGS. 1 to 11, inclusive, from the standpoint that, instead of delivering a number of the inserts to the track or runway, the machine will be operated from the standpoint of first delivering one insert to the runway by actuation of the feed or pusher strip, as at 38 in FIG. 5, to deliver one insert and, before this delivery, the plunger 121 is actuated to move the escape lever 110 into inoperative position, as indicated in dotted lines in FIG. 12, so that the delivered insert will extend to and be checked by the lever 111; whereupon, the air is shut-off from the cylinder 122, the spring 116 will return the lever 110 to the operative position; whereupon the next insert is delivered and supported in the position shown at 125, whereupon the two grippers 124, 124' will deliver the pair of inserts to the molding station 57', the travelers 127, 127' then formed thereon, after which, the grippers will return to the position shown in FIG. 12 and the guide units 128, 128' will be moved into the position shown in FIG. 12, preparatory to the feed of the molded products to the trimming and stripper station 67', this being done through the medium of a transfer core rod, similar to the rod 66 shown in FIGS. 2 and 8, and omitted from FIG. 12 for simplifying this illustration.

In the aforesaid operation, it will also be apparent that, during the molding operation and when the grippers are in the lowered position supporting the inserts between the dies, one of which is shown at 126, inserts could be delivered to the position shown at 125, 125' through actuation of the plunger 121, so that, upon return of the grippers to the position shown in FIG. 12, the grippers will be maintained in their open position and closed to engage and grip the inserts, preparatory to moving the pair of inserts to the molding station. In this manner, there will be no loss of time in each cycle of operation of the entire apparatus.

Having fully described my invention, what I claim as new and desire to secure by Letters Patent is:

1. The method of forming a traveler having a substantially L-shaped wire insert with an apex and two leg portions, which consists in delivering an insert from a preloaded magazine to a pickup station along a track ending adjacent a pair of dies at a molding station with the apex of said insert projecting from said track, then picking up said insert at the pickup station with pickup means engaging said projecting apex portion of said insert and delivering the same along a predetermined path to and supporting the insert at the molding station with the pickup means and the apex of said insert outside said dies of the molding station and the legs of said insert inside said dies, closing said dies while still holding said insert with said pickup means, molding a plastic traveler on said insert at said station by molding a plastic part on each of said legs of said insert while still holding said insert by said pickup means, removing said pickup means from said insert and returning it to its first position to grasp the next insert, and then with the use of a second pickup means cooperating with the apex of said insert feeding the molded traveler to a trimming and stripper station.

2. A method as defined in claim 1, wherein an insert is momentarily supported at the pickup station in position to be picked up for delivery to the molding station.

3. A method as defined in claim 1, wherein the insert of the molded traveler is guided in movement of the molded traveler from the molding station to the trimming station.

References Cited
UNITED STATES PATENTS

| | | | |
|---|---|---|---|
| 2,966,026 | 12/1960 | Morin | 264—271 |
| 2,973,556 | 3/1961 | Morin. | |
| 3,014,245 | 12/1961 | Morin. | |
| 3,205,570 | 9/1965 | Morin | 264—161 |

ROY B. MOFFITT, *Acting Primary Examiner.*

S. I. LANDSMAN, *Assistant Examiner.*